(12) United States Patent
Hubbard (10) Patent No.: US 7,021,614 B2
(45) Date of Patent: Apr. 4, 2006

(54) TRUSS ASSEMBLY TABLE WITH WEDGE SET STOP MEMBERS

(76) Inventor: Sean Hubbard, 3314 Prospect St., Indianapolis, IN (US) 46203

( * ) Notice: Subject to any disclaimer, the term of this patent is extended or adjusted under 35 U.S.C. 154(b) by 91 days.

(21) Appl. No.: 10/722,078

(22) Filed: Nov. 25, 2003

(65) Prior Publication Data
US 2004/0119219 A1   Jun. 24, 2004

Related U.S. Application Data

(60) Provisional application No. 60/429,881, filed on Nov. 27, 2002.

(51) Int. Cl.
*B25B 1/20* (2006.01)
(52) U.S. Cl. .................. 269/37; 269/910; 269/305
(58) Field of Classification Search .................. 269/37, 269/910, 305, 304, 99, 900; 29/281.1, 281.3
See application file for complete search history.

(56) References Cited

U.S. PATENT DOCUMENTS

| | | | |
|---|---|---|---|
| 3,704,880 A | 12/1972 | Gudel | |
| 5,608,970 A * | 3/1997 | Owen | 29/897.31 |
| 5,702,095 A * | 12/1997 | Williams | 269/37 |
| 5,810,341 A * | 9/1998 | Williams | 269/37 |
| 5,941,514 A | 8/1999 | Burcaw | |
| 6,029,967 A | 2/2000 | Wolfe | |
| 6,042,096 A | 3/2000 | MacLean | |
| 6,105,951 A | 8/2000 | Shibata | |
| 6,155,549 A | 12/2000 | Burcaw | |
| 6,170,163 B1 * | 1/2001 | Bordignon et al. | 33/16 |
| 6,217,014 B1 | 4/2001 | Wolfe | |
| 6,267,365 B1 | 7/2001 | Anglin et al. | |
| 6,702,269 B1 * | 3/2004 | Tadich | 269/37 |
| 2004/0119219 A1 * | 6/2004 | Hubbard | 269/37 |

* cited by examiner

Primary Examiner—Lee D Wilson
(74) Attorney, Agent, or Firm—Baker & Daniels LLP (57) ABSTRACT

The present invention involves a truss table including a frame; multiple spaced-apart panels supported by the frame and defining an elongated slot between the panels; and a stop member including a stop portion, a clamp portion and a fastener. The stop portion includes a cylindrical puck and a wedge body extending from the cylindrical puck and having a ramped surface, the wedge body disposable within the elongated slot, the stop portion defining a first bore extending through the cylindrical puck and the wedge body. The clamp portion is disposable within the elongated slot and has a ramped top surface complementary to the ramped surface of the wedge body. The clamp portion defines a second bore substantially aligned with the first bore. The fastener is insertable through the first bore and engageable to the second bore. The tightening of the fastener secures the stop member in a locked position in the elongated slot.

16 Claims, 7 Drawing Sheets

TRUSS ASSEMBLY TABLE WITH WEDGE SET STOP MEMBERS

PRIORITY REFERENCE

This application claims the benefit of priority under 35 U.S.C. §119(e) to Provisional Application Ser. No. 60/429,881, filed Nov. 27, 2002.

BACKGROUND OF THE INVENTION

1. Field of Invention

This invention relates, generally, to truss assembly tables and, more particularly, to truss assembly tables having stop members for positioning truss planks.

2. Background Art

Wooden trusses are support structures used in the construction of roofs and floors of buildings. Typically, wooden trusses comprise a series of lumber planks arranged in a triangular pattern. The particular design of the wooden truss varies depending on the design and size of the building in which they are used. However, the construction of a single building commonly requires several trusses of the same size.

Wooden trusses are commonly assembled on a series of truss assembly tables that provide a large work surface at a working height above a shop floor. To assemble the truss, the planks are first arranged and secured in the correct configuration on the surface of the table. A pressure roller or hydraulic press then presses attachment plates into adjoining planks thereby fixing the planks in the desired configuration. Chalk lines, measuring tape and other inefficient devices are used to arrange the planks in the proper configuration for the assembly of each truss. Consequently, the task of arranging the planks in the proper configuration is particularly time-consuming.

To hasten the time-consuming task of arranging the planks, locator stops or jigs have been used to indicate the proper placement of planks on the table. The traditional locator stops include pins for attaching the locator stops to the truss table. The traditional truss table has a grid of apertures, which receive the pins of the locator stops. Once the locator stops are properly positioned, the planks are arranged about the stops and the roller or press attaches the planks to one another using an attachment plate. The assembled truss is then removed and the locator stops remain in place to quickly guide the positioning of the planks for the assembly of the remaining identical trusses.

More recent systems have been designed to aid in the quick positioning of truss planks. For instance, one known system has a stop unit having a stop, which rests on the surface of the table and engages the planks. The stop is mounted on a block or clamp member that slides within a C-shaped channel having upper lips level with the table. The channel extends along the length of the truss table, thereby allowing the stop to move to any position along the channel. A measuring scale extends along the top of the channel for indicating the location of the stops.

Another stop locator or jig system includes a jig positioned upon a worm gear located within a C-shaped channel. Rotation of the worm gear causes the jig to translate within the channel to the desired location.

Another exemplary locator stop system includes a pair of locator stops mounted on an oblong jig body. The jig body slides along a rail or ruler, which is attached to the surface of the truss table. The jig body is secured in position by a bolt, which engages apertures in the table.

One locator stop system includes a series of spaced-apart, elongated steel panels supported by a frame. The panels are elevated from the frame by spacing members such that the walls of the spacing members together with the lower surfaces and edges of the panels form a T-shaped channel. The system further includes locator stops, each having a stop portion residing above the panel and a slide portion that slides within the T-shaped channel beneath the lower surface of the panels. The locator stop has a clamping portion between the slide portion and the stop portion that locks the locator stop in position.

Most of these prior locator stops include a base or sliding portion that slides within a C-shaped or T-shaped channel and is located beneath the table or the channel lips. Unfortunately, the sliding base can tilt within the channel making it difficult to smoothly and effectively slide the stop locator to another location within the channel. Also, substantial friction can develop between the sliding base and the channel further hindering the smooth and effective movement of the stop locator. Finally, the prior locator stops are difficult to remove from and install in the channels because the sliding base must be installed beneath the panels or channel lips. Consequently, the prior locator stop must either be disassembled or slid all the way to the end of the channel in order to be removed.

Another locator stop system includes a truss assembly table having a series of elongated, spaced-apart support members supported by a table. The walls of the adjacent support members form a slot. The locating device includes a base that slides within the slot. A bobbin is attached to the top of the base and extends above the surface of the table. The base includes at least one bolt, which is positioned entirely within the channel and is arranged perpendicular to the sidewall of the channel The head of the bolt engages the sidewall of the channel to lock the base in position. However, the head of the bolt may be difficult and cumbersome to access, thus making this system awkward and inefficient.

Although many attempts have been made to improve locator stop systems, a need remains for an effective and efficient locator stop system in which the locator stop can be quickly and easily moved from one position to another along the truss table.

SUMMARY OF THE INVENTION

The present invention, in one form thereof, provides a truss assembly table having stop members that can easily translate along a slot or channel. The stop member is capable of engaging the lateral walls of the slot, and therefore, eliminates the need for a T-shaped and/or C-shaped channels. In addition, the stop member can be easily installed in and removed from a slot or channel within the truss assembly table.

In one form, the invention provides for a truss assembly table comprising a frame; a plurality of elongated panels supported by the frame, each panel having an upper surface, a lower surface and opposing lateral edges, the lower surface of the panels abutting the frame, the plurality of panels being arranged on the frame in spaced relation to one another such that an elongated slot is formed between the lateral edges of the panels; and at least one stop member.

The stop member includes a stop portion having a cylindrical puck and a wedge body, the cylindrical puck defining an axis, the wedge body extending from the cylindrical puck along the axis and having a ramped surface and a first sidewall, the wedge body disposable within the elongated slot, the stop portion defining a first bore extending through the cylindrical puck and through the wedge body along the axis. The stop member also includes a clamp portion disposable within the elongated slot, the clamp portion having a ramped top surface complementary to the ramped surface of the wedge body, a bottom surface, and a second sidewall, the clamp portion defining a second bore extending from the ramped top surface to the bottom surface, the second bore substantially aligned with the first bore. The stop member includes a fastener insertable through the first bore and engageable to the second bore. In a related aspect, the tightening of the fastener secures the stop member in a locked position in the elongated slot, wherein the first and second sidewalls fixedly abut the lateral edges.

In another embodiment, the present invention involves a stop member for use in a truss table having a plurality of elongated panels supported by a frame, each panel having opposing lateral edges, the plurality of panels being arranged on the frame in spaced relation to one another such that an elongated slot is formed between the lateral edges of adjacent panels, the stop member comprising a stop portion having a cylindrical puck and a wedge body, the cylindrical puck defining an axis, the wedge body extending from the cylindrical puck along the axis and having a ramped surface and a first sidewall, the wedge body disposable within the elongated slot, the stop portion defining a first bore extending through the cylindrical puck and through the wedge body along the axis; a clamp portion disposable within the elongated slot, the clamp portion having a ramped top surface complementary to the ramped surface of the wedge body, a bottom surface, and a second sidewall, the clamp portion defining a second bore extending from the ramped top surface to the bottom surface, the second bore substantially aligned with the first bore; and a fastener insertable through the first bore and engageable to the second bore.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 2b is an enlarged top plan view of the stop member of FIG. 2a;

FIG. 3a is a side view of the truss assembly table and stop member of FIG. 2a;

FIG. 3b is an enlarged side view of the stop member of FIG. 3a;

FIG. 7a is a top view of the puck piece of the stop member of FIG. 6a;

FIG. 7b is a side view of the puck piece of FIG. 7a;

FIG. 8a is a top view of the base piece of the stop member of FIG. 6a;

FIG. 8b is a side view of the base piece of FIG. 8a;

FIG. 9a is a side view of the clamp portion of the stop member of FIG. 6a; and

FIG. 9b is a top view of the clamp portion of FIG. 9a.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1:
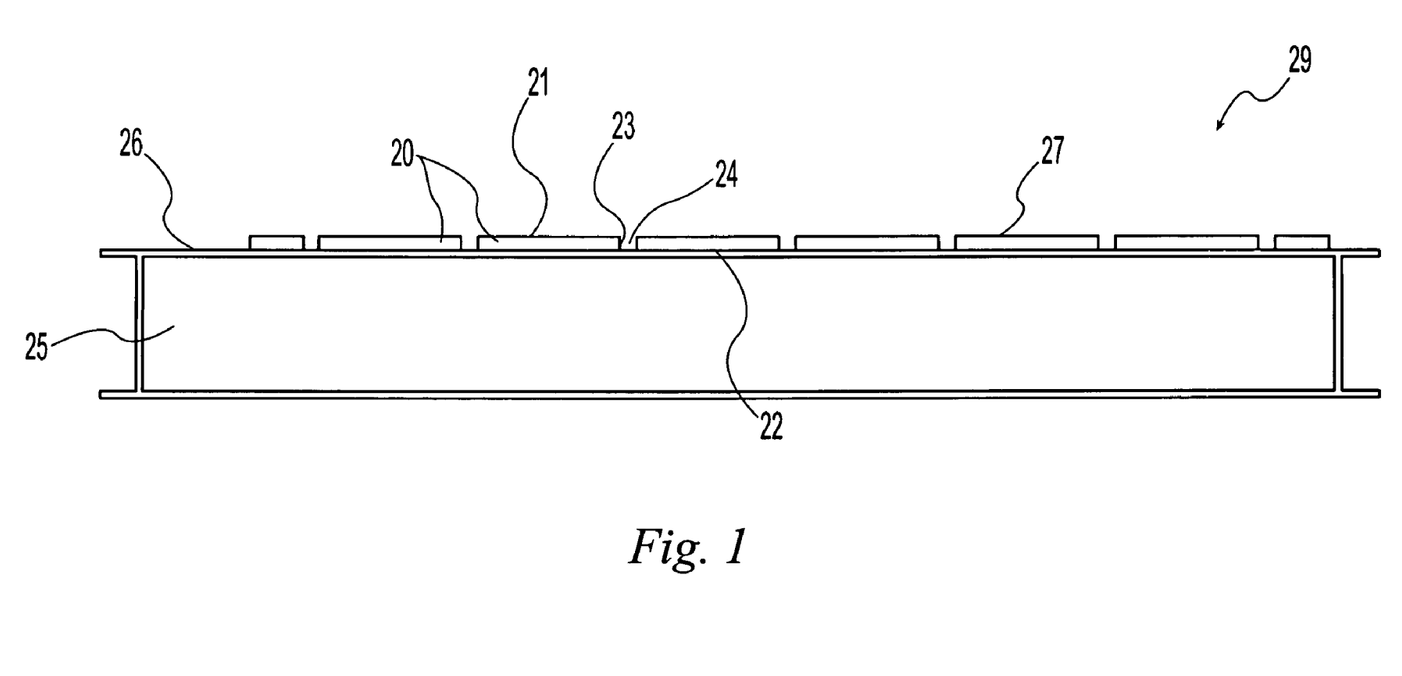
FIG. 1 is a side view of a truss assembly table according to one embodiment of the present invention.
Figure 5:
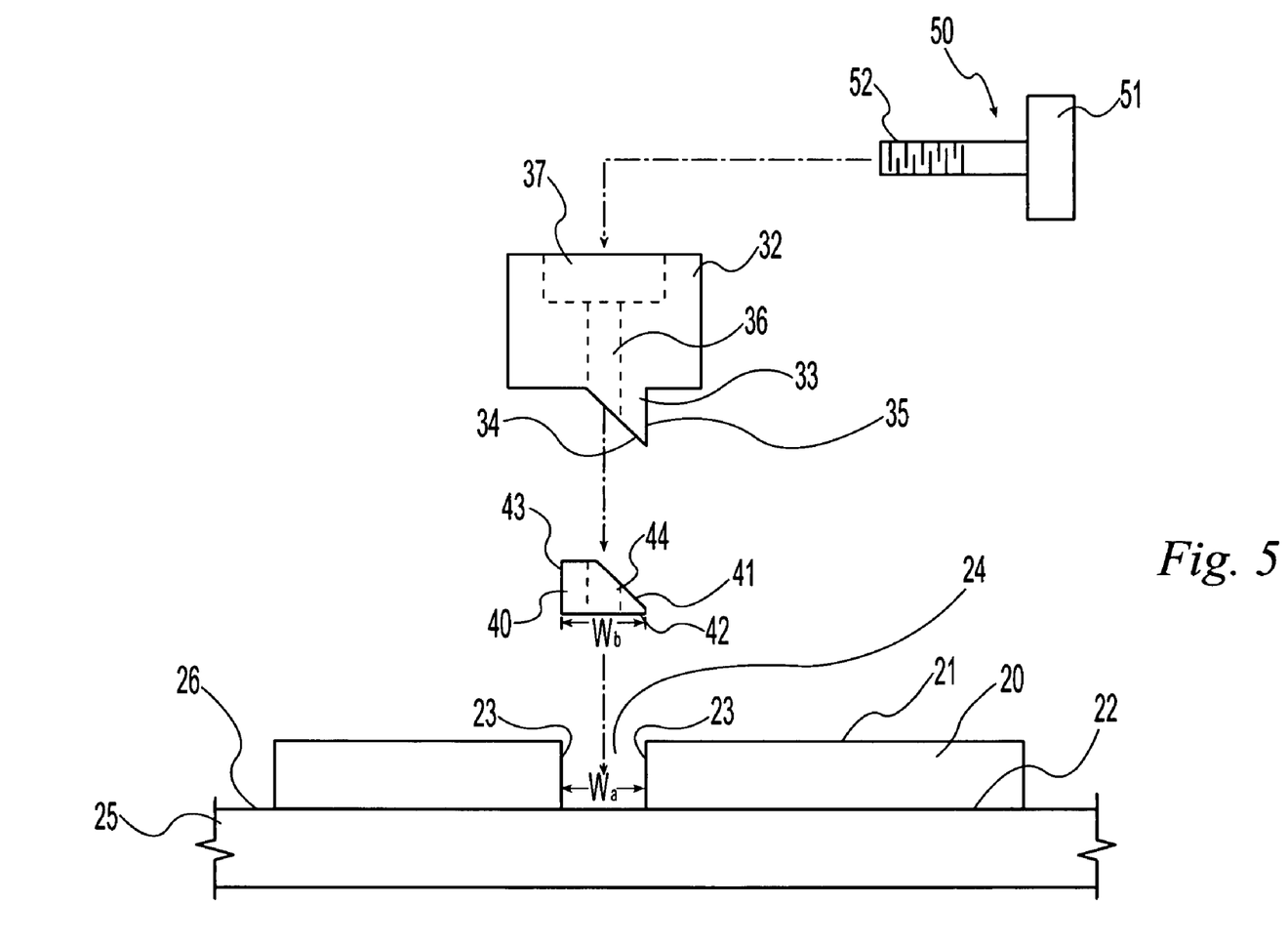
FIG. 5 is an exploded side view of the disassembled stop member of FIG. 3a the present invention.

Truss assembly table 29 of the present invention is shown in FIG. 1 and includes a plurality of elongated panels 20 supported by frame 25. Plurality of panels 20 make up work surface 27 on which truss members or planks (not shown) are arranged and joined to make a truss. Frame 25 is supported by legs (not shown) so that frame 25, and thus work surface 27, is elevated from the floor. Each panel 20 has upper surface 21, lower surface 22 and opposing lateral edges 23. Each panel 20 is mounted on frame 25 such that lower surface 22 of panels 20 abuts the upper surface 26 of frame 25. As best illustrated in FIGS. 2a and 5, panels 20 are arranged on surface 26 of frame 25 in spaced relation to one another such that an elongated slot 24 having a width $W_a$ is formed between lateral edges 23 of adjacent panels 20.

Figure 2A:
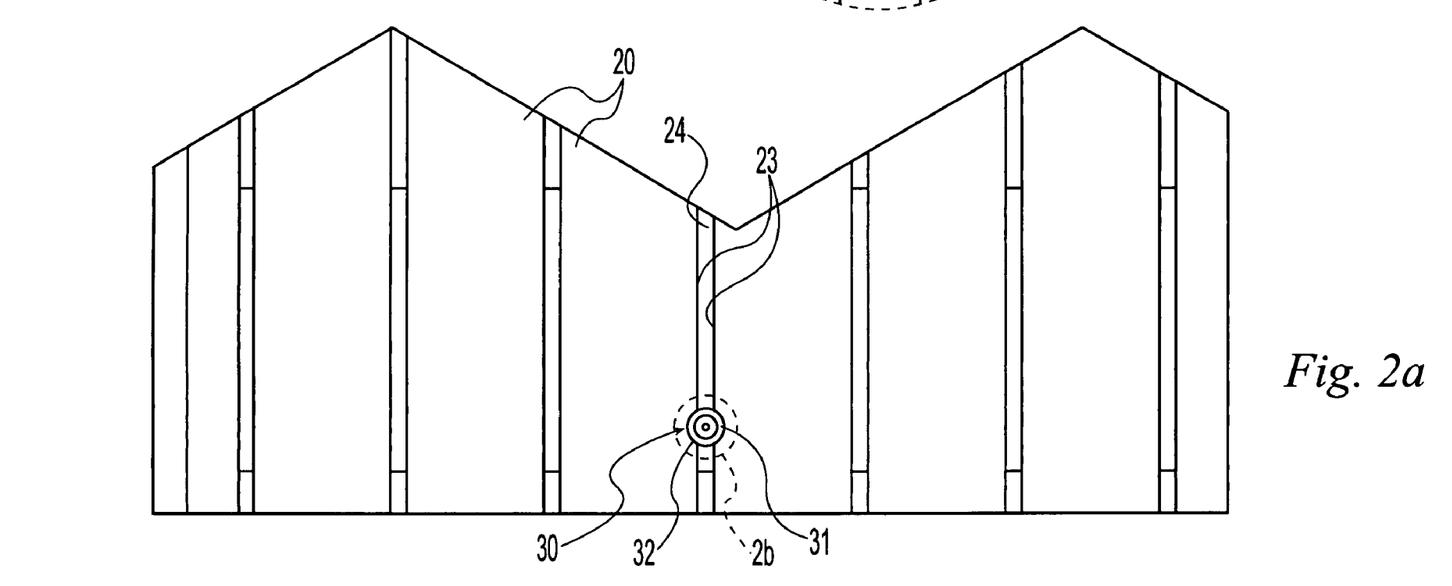
FIG. 2a is a top view of the truss assembly table and stop member according to one embodiment of the present invention.
Figure 2B:
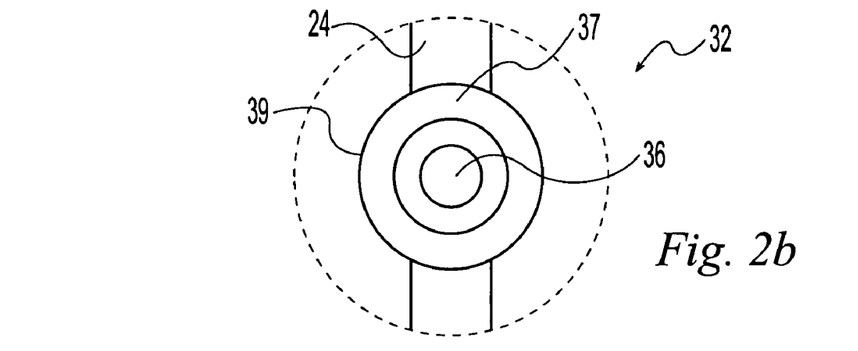
Figure 3A:
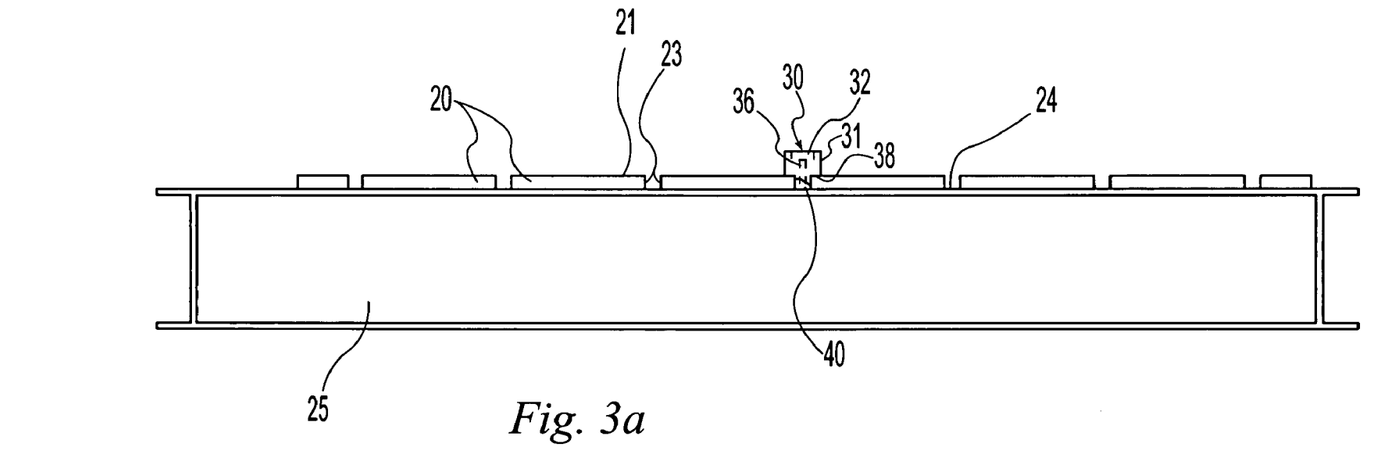
Figure 3B:
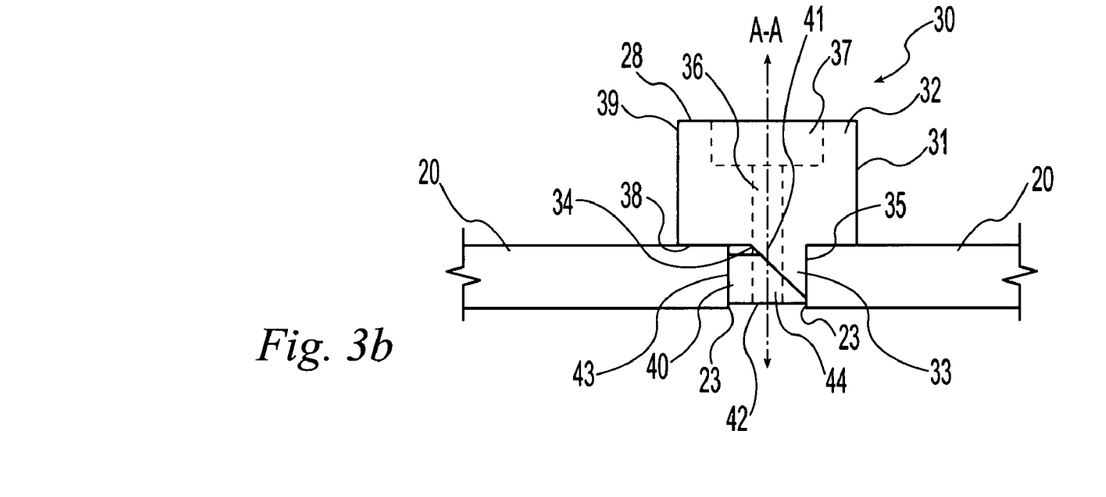

Referring now to FIGS. 2a–b and 3a, the present invention also contemplates stop member 30 for use in cooperation with any truss assembly table having an elongated slot or channel. Stop member 30 can be used in cooperation with elongated slot 24 of truss assembly table 29 to aid in the positioning of truss planks (not shown). Turning to FIGS. 3a–b and 4a–b, stop member 30, generally, includes one-piece stop portion 31, clamp portion 40 and fastener 50.

As shown in FIGS. 3a–b and 4a–b, stop portion 31 includes cylindrical puck 32 and wedge body 33, which may be integrally formed. Cylindrical puck 32 includes cylindrical outer wall 39, top puck surface 28, and bottom puck surface 38. Bottom puck surface 38 rests on upper surface 21 of panels 20, while the body of cylindrical puck 32 extends above upper surface 21 of panels 20. Recess 37 is defined in top puck surface 28 of cylindrical puck 32. Cylindrical puck 32 defines an axis A—A from which wedge body 33 extends. Wedge body 33 has ramped bottom surface 34 and first sidewall 35. Wedge body 33 is sized such that it can be easily inserted into elongated slot 24. Stop portion 31 defines first bore 36 having a cylindrical cross-section and extending along axis A—A from top puck surface 28 of cylindrical puck 32 through stop portion 31 to the ramped wedge surface 34 of wedge body 33.

Stop portion 31 may be made of any rigid or semi-rigid material suitable for serving as a bearing surface for the lumber planks of the truss. For example, stop portion 31 may be formed from steel, iron, aluminum alloy or other hard metals. Alternatively, stop portion 31 may be made of rubber, plastic, polyurethane, or the like. Stop portion 31 may be molded or cast as a single integral part, or cylindrical puck 32 and wedge body 33 may be separately formed and then joined. Cylindrical puck 32 and wedge body 33 may be formed of the same or different materials. For instance, cylindrical puck 32 may be formed of hard rubber, while wedge body 33 may be formed of steel. In one embodiment, stop portion 31 is investment cast from steel as a single integral body.

As illustrated in FIGS. 3b, 4a–b and 5, clamp portion 40 has bottom surface 42, second sidewall 43 and ramped top surface 41. Ramped top surface 41 of clamp portion 40 is complementary to the ramped bottom surface 34 of wedge body 33, such that when the ramped surfaces 34 and 41 meet they are substantially flush with one another. Clamp portion 40 defines second bore 44 extending from ramped top surface 41 to bottom surface 42. Second bore 44 is substantially aligned with first bore 36 of stop portion 31. Claim portion 40 defines width $W_b$ extending along the width of bottom surface 42. Width $W_b$ is sized slightly smaller than width $W_a$ of slot 24, such that clamp portion 40 fits loosely within slot 24. Clamp portion 40 may be made of steel, iron aluminum alloy or other hard metals. Alternatively, clamp portion 40 may be formed of plastic, polyurethane or other similar rigid material.

As best illustrated in FIG. 5, fastener 50 loosely extends through first bore 36 and engages second bore 44, thereby connecting stop portion 31 to clamp portion 40. Fastener 50 can be any effective fastener capable of joining stop portion 31 and clamp portion 40, such as a bolt or screw. As shown in FIG. 5, fastener 50 may have a fastener head 51 at one end and threads 52 at the opposite end. When fastener 50 is inserted into cylindrical puck 32, fastener head 51 rests in recess 37. Threads 52 of fastener 50 engage complementary threads (not shown) in second bore 44 of clamp portion 40.

Figure 6A:
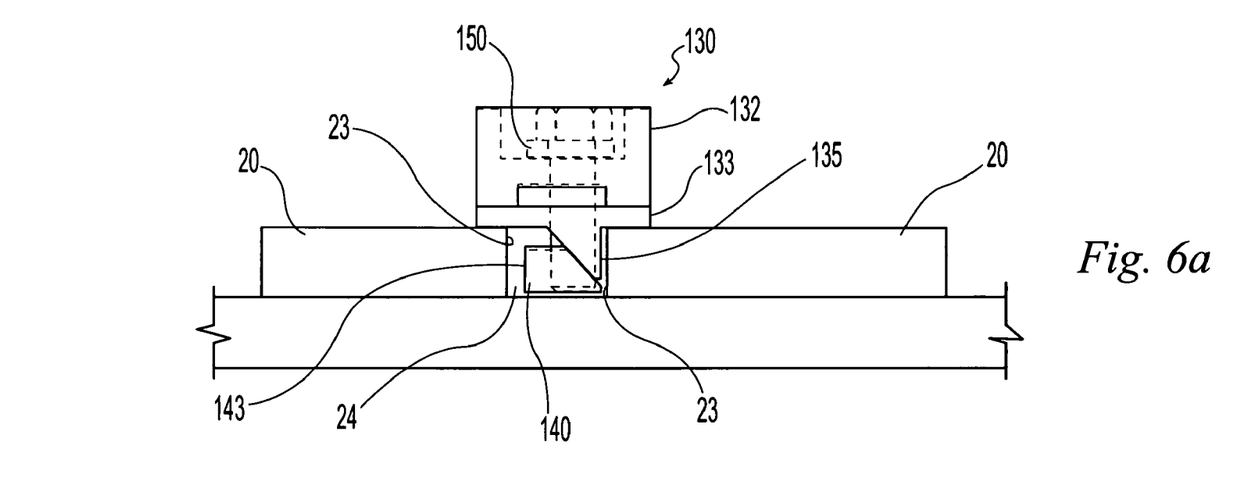
FIG. 6a is a side view of a truss assembly table and stop member according to another embodiment of the present invention wherein the stop member is disposed between panels of the truss assembly table in an unlocked position.

An alternative embodiment of the present invention is illustrated in FIGS. 6a–9b, wherein stop member 130 includes stop portion 131, clamp portion 140 and fastener 50. Referring particularly to FIGS. 6a and 6b, stop portion 131 includes cylindrical puck piece 132 and base piece 133, which are separately formed. As shown in FIGS. 7a–7b, cylindrical puck piece 132 includes cylindrical outer wall 139, top puck surface 128, and bottom puck surface 138. Cylindrical puck piece 132 defines an axis B—B extending through puck piece 132 from top surface 128 to bottom surface 138. Recesses 37a and 37b are defined in top and bottom puck surfaces 128, 138, respectively. Referring now to FIGS. 8a–8b, base piece 133 includes wedge body 133a, cylindrical body 133b, and connector body 133c. Connector body 133c extends upwardly from cylindrical body 133b and fits within recess 37b to connect base piece 133 to puck piece 132. Wedge body 133a extends downwardly from cylindrical body 133b and defines ramped bottom surface 134 and first sidewall 135. Stop portion 131 defines first bore 136 having an elongate oval cross-section and extending through stop member 130 along axis B—B from top puck surface 128 to ramped bottom surface 134.

Figures 8A, 8B, 9A, 9B:
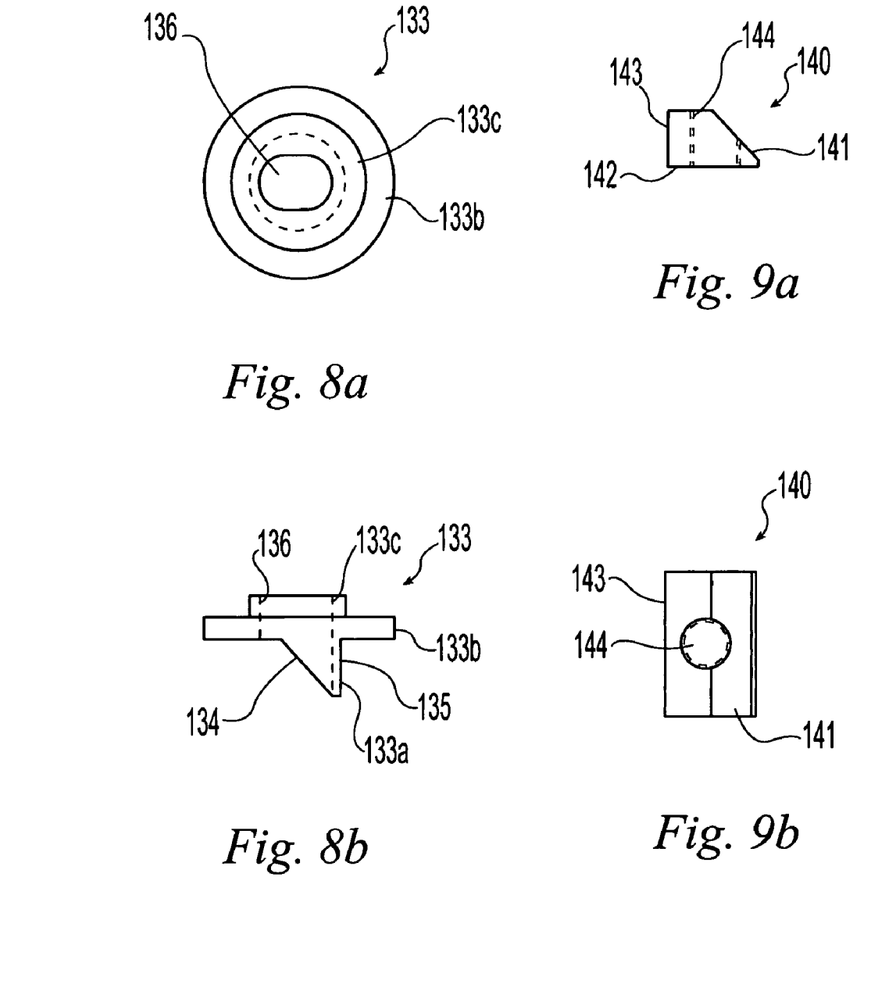

Referring now to FIGS. 9a–9b, clamp portion 140 defines bottom surface 142, second sidewall 143 and ramped top surface 141. Ramped top surface 141 is complementary to ramped bottom surface 134 of stop portion 131. Clamp portion 140 defines second bore 144 extending from ramped top surface 141 to bottom surface 142. Second bore 144 is substantially aligned with first bore 136 and is threaded. Fastener 50 loosely extends through first bore 136 and threadedly engages second bore 44 to connect stop portion 131 to clamp portion 140.

Figure 4A:
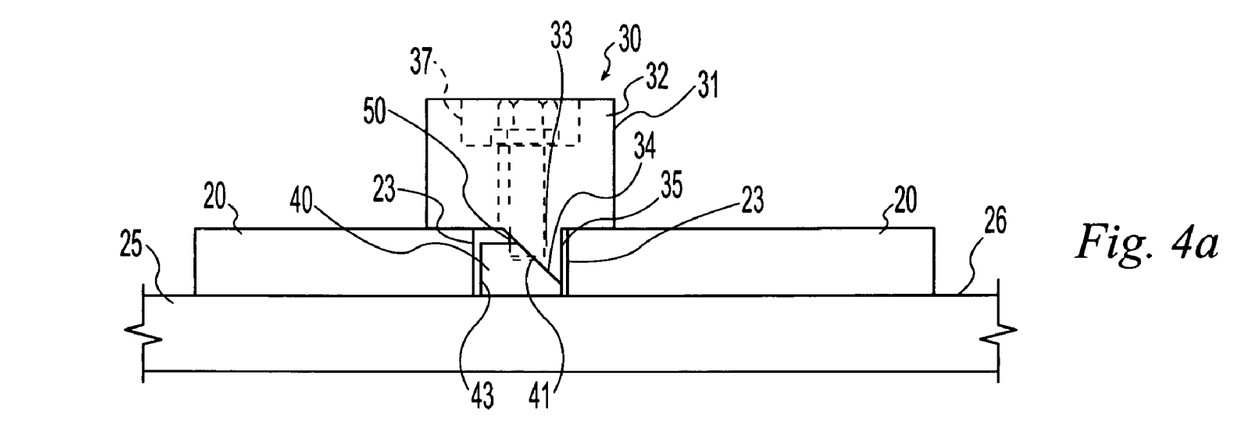
FIG. 4a is a side view of the stop member of FIG. 3a disposed between panels of the truss assembly table of the present invention in an unlocked position.

In operation of both the embodiments of FIGS. 4a–4b and 6a–6b, the tightening of fastener 50 secures stop member 30, 130 in a locked position (shown in FIGS. 4b and 6b) within elongated slot 24, while the loosening of fastener 50 releases the stop member 30, 130 (shown in FIGS. 4a and 6a) from the locked position. More specifically, clamp portion 40, 140 and wedge body 33, 133a of stop member 30, 130 are inserted into elongated slot 24 when fastener 50 is loosely joining stop portion 31, 131 to clamp portion 40, 140, as shown in FIGS. 4a and 6a. In this released position, a small gap exists between lateral edges 23 of panels 20 and the first and second sidewalls 35,43 of stop member 30, 130, such that stop member 30, 130 fits loosely within elongated slot 24 and can slide freely within elongated slot 24. In this released position, the operator can locate and re-locate stop member 30, 130 by sliding it to a desired position within slot 24. Alternatively, when in the released position, the operator can locate and re-locate stop member 30, 130 by simply removing stop member 30, 130 from slot 24 and re-inserting it at the desired location.

Figure 4B:
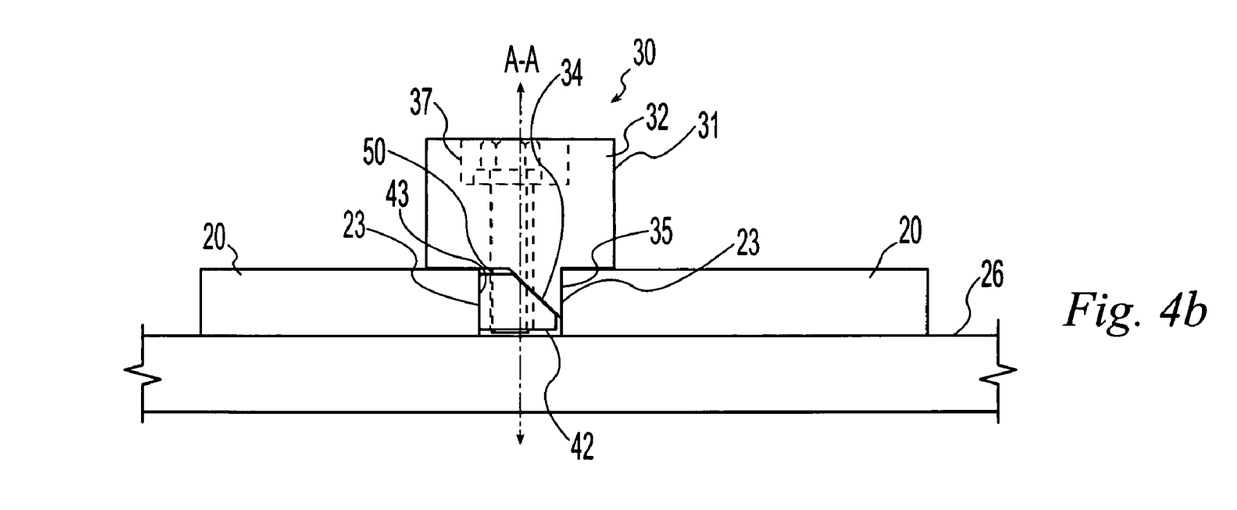
FIG. 4b is a side view of the stop member of FIG. 3a disposed between panels of the truss assembly table of the present invention in a locked position.
Figure 6B:
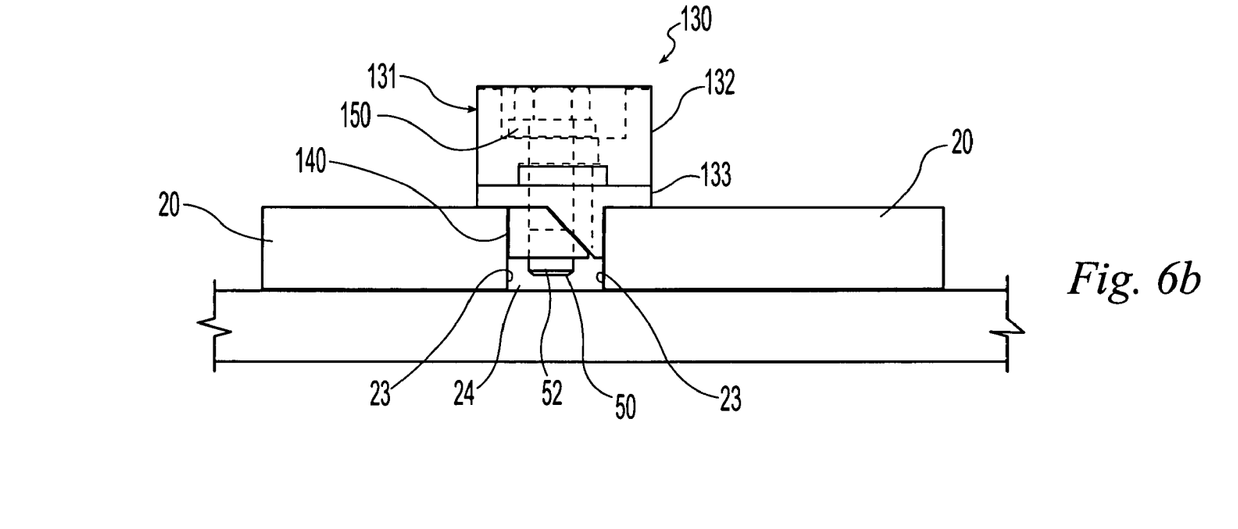
FIG. 6b is a side view of truss assembly table and stop member of FIG. 6a wherein the stop member is disposed between panels of the truss assembly table in a locked position.

To secure stop member 30, 130 in a locked position within slot 24, as shown in FIGS. 4b and 6b, fastener 50 is tightened causing clamp portion 40, 140 to move up threads 52 of fastener 50. The upward movement of clamp portion 40, 140 brings ramped top surface 41, 141 of clamp portion 40, 140 in contact with ramped bottom surface of 34, 134 of wedge body 33, 133. Further tightening of fastener 50 causes clamp portion 40, 140 to move farther upward, in turn forcing ramped top surface 41, 141 to slide up ramped bottom surface 34, 134. This sliding movement compels the lateral movement of clamp portion 40, 140 and wedge body 33, 133a within slot 24 outward toward lateral edges 23 of panels 20 such that first sidewall 35, 135 and second sidewalls 43, 143 fixedly abut opposing lateral edges 23, thereby pressure mounting stop member 30, 130 within slot 24. To accommodate the lateral movement of clamp portion 40 and wedge body 33 within slot 24, fastener 50 may have a diameter smaller than that of bore 36, such that fastener fits loosely within bore 36 and is permitted to move laterally within bore 36, as shown in FIGS. 4a and 4b. Alternatively, as shown in FIGS. 6a and 6b, bore 136 may be elongated in cross-section to allow fastener 50 to move laterally within bore 136 and, in turn, permit clamp portion 140 and wedge body 133a to move laterally within slot 24. Also, a washer 150 may be used to help secure fastener 50 within bores 136 and 144.

The operator may now install, position and lock additional stop members in an arrangement suitable for configuring truss planks. The truss planks are arranged around the stop members and cylindrical wall 39, 139 of stop member 30, 130 provides a surface for supporting and guiding the truss planks in position for assembly.

Figure 7A:
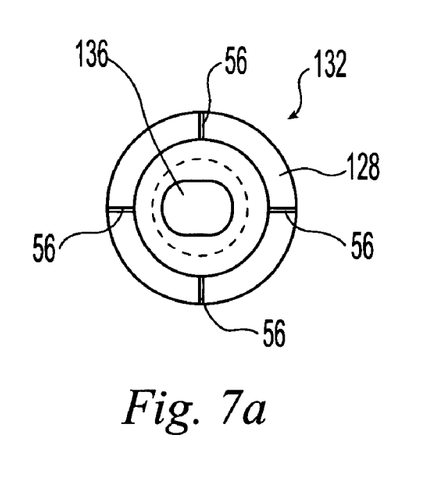
Figure 7B:
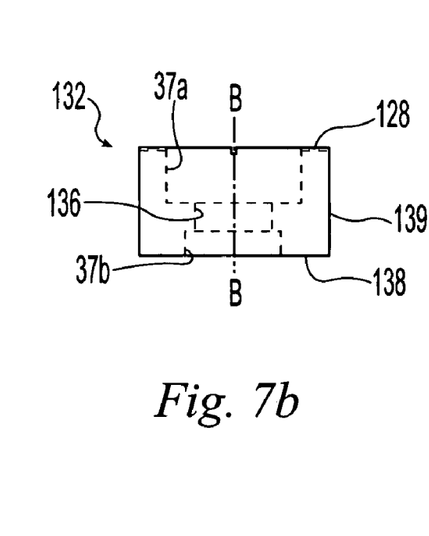

To further aid in the positioning of truss planks, truss table assembly 29 of the present invention may include measuring markings (not shown) affixed to, coupled to, or etched into work surface 27. Alternatively, laser positioning devices may be associated with work surface 27 to aid in such positioning (not shown). Such devices may provide reference points to facilitate the positioning of the stop members 30, although such devices are not needed for successful operation of truss table assembly 29. As shown in FIG. 7*a*, top puck surface 128 of puck piece 132 may include one or more grooves or cross-hairs 56 which are used in conjunction with overhead laser systems to accurately position the stop members. More particularly, a series of lasers may be positioned above the truss table and arranged such that each laser projects a cross pattern on the table below. The lasers may be manually or electronically (automatically programmed) positioned such that each laser projects the cross pattern at the desired location of the stop member. The stop member is then installed within the slots in the table and positioned such that cross-hairs 56 are aligned with the cross projected on the table by the laser.

Because the present stop member can directly engage the lateral edges 23 of panels 20, the present stop member does not require a T-shaped channel located beneath the lower surface of the elongated panels, nor does it require a C-shaped channel having upper lips. However, the present stop member may be used with prior truss assembly tables having a T-shaped channel. The stop member of the present invention may also be used with the truss assembly table of the present invention in which panels 20 rest directly on top of frame 25 and are spaced apart from one another to form a slot 24. As a result, use of the present stop member eliminates the need for the T-shaped channel of prior truss assembly tables, thus eliminating the need for spacing members to elevate the panels from the frame. Elimination of spacing members reduces the costs of truss table materials and assembly resulting in an overall lower truss table manufacturing cost.

When in the unlocked position shown in FIG. 4*a*, the present stop member 30 can easily slide within slot 24 without substantial friction or hindering by a base beneath the panels. Moreover, the present stop member, when in the unlocked position, can be easily removed from and installed in the slot. Furthermore, when arranging truss planks on the truss assembly table, an additional stop member may be needed. Because the present stop members can be easily removed and installed, an additional stop member can be quickly added to the slot, thereby increasing efficiency. Also, unemployed stop members in one slot can be easily removed and installed in another slot.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A truss assembly table comprising:
   a frame;
   a plurality of elongated panels supported by said frame, each panel having an upper surface, a lower surface and opposing lateral edges, said lower surface of said plurality of panels abutting said frame, said plurality of panels being arranged on said frame in spaced relation to one another such that an elongated slot is formed between said lateral edges of said panels; and
   at least one stop member, said stop member having first and second sidewalls, each of said at least one stop member capable of being positioned in a locked position wherein said first and second sidewalls fixedly abut said lateral edges of said panels and a released position wherein said first and second sidewalls are laterally displaced relative to one another and are free of said lateral edges of said panels;
   wherein said at least one stop member includes a stop portion having a cylindrical puck and a wedge body, said cylindrical puck defining an axis, said wedge body extending from said cylindrical puck along said axis and having a ramped surface and said first sidewall, said wedge body capable of engagement within said elongated slot, said stop portion defining a first bore extending through said cylindrical puck and through said wedge body along said axis; and
   wherein said at least one stop member includes a clamp portion disposable within said elongated slot, said clamp portion having a ramped top surface complementary to said ramped surface of said wedge body, a bottom surface, and said second sidewall, said clamp portion defining a second bore extending from said ramped top surface to said bottom surface, said second bore substantially aligned with said first bore.

2. The truss assembly table of claim 1 wherein said at least one stop member includes a fastener insertable through said first bore and engageable to said second bore.

3. The truss assembly of claim 2 wherein said first bore defines an elongate oval cross section.

4. The truss assembly table of claim 2 wherein tightening of said fastener secures said stop member in said locked position in the elongated slot, wherein said first and second sidewalls fixedly abut said lateral edges.

5. The truss assembly of claim 2 wherein said cylindrical puck includes a top surface, said top surface defining at least one groove.

6. The truss assembly of claim 1 wherein said cylindrical puck and said wedge body are integrally formed with one another.

7. The truss assembly of claim 1 wherein said stop portion comprises a puck piece and a base piece, said puck piece including said cylindrical puck, said cylindrical puck including a bottom surface, said bottom surface defining a connector recess, said base piece defining said wedge body and a connector body, said connector body fitting within said connector recess to couple said base piece to said puck piece.

8. A stop member for use in a truss table having a plurality of elongated panels supported by a frame, each panel having opposing lateral edges, the plurality of panels being arranged on the frame in spaced relation to one another such that an elongated slot is formed between the lateral edges of adjacent panels, the stop member comprising:
   a stop portion having a cylindrical puck and a wedge body, said cylindrical puck defining an axis, said wedge body extending from said cylindrical puck along said axis and having a ramped surface and a first sidewall adapted to engage a lateral edge of one of the adjacent panels, said wedge body disposable within the elongated slot, said stop portion defining a first bore extending through said cylindrical puck and through said wedge body along said axis;
   a clamp portion disposable within said elongated slot, said clamp portion having a ramped top surface complementary to said ramped surface of said wedge body, a bottom surface, and a second sidewall adapted to engage a lateral edge of the other one of the adjacent panels, said clamp portion defining a second bore extending from said ramped top surface to said bottom surface, said second bore substantially aligned with said first bore; and a fastener coupling said stop portion and said clamp portion, said fastener extending through said first bore and engaged with said second bore.

9. The stop member of claim 8 wherein tightening of said fastener secures said stop member in a locked position in the elongated slot, wherein said first and second sidewalls fixedly abut the lateral edges of the adjacent panels.

10. The truss assembly of claim 8 wherein said first bore defines an elongate oval cross section.

11. The truss assembly of claim 8 wherein said cylindrical puck includes a top surface, said top surface defining at least one groove.

12. The truss assembly of claim 8 wherein said stop portion is a one-piece stop portion.

13. The truss assembly of claim 8 wherein said stop portion is a two-piece stop portion comprising a puck piece and a base piece, said puck piece including said cylindrical puck, said cylindrical puck including a bottom surface, said bottom surface defining a connector recess, said base piece defining said wedge body and a connector body, said connector body fitting within said connector recess to couple said base piece to said puck piece.

14. A truss assembly system comprising:
   a truss table including a work surface and an elongated slot defined in said work surface, said elongated slot being defined by a pair of opposing lateral walls;
   a stop member comprising:
      a stop portion at least partially disposed within said elongate slot and including top surface, a ramped bottom surface and a first sidewall, said stop portion defining a first bore extending through said stop portion from said top surface to said ramped bottom surface;
      a clamp portion disposed within said elongated slot, said clamp portion having a ramped upper surface complementary to said ramped bottom surface of said wedge body, a lower surface, and a second sidewall, said clamp portion defining a second bore extending from said ramped top surface to said lower surface, said second bore substantially aligned with said first bore; and
      said fastener extending through said first bore and engaging said second bore, said fastener movable between a tightened position, wherein said first and second sidewalls fixedly abut said lateral walls of said elongated slot to secure said stop member in said slot, and a loosened position, wherein said first and second sidewalls are free from said lateral walls and said stop member is loosely disposed within said slot.

15. The truss assembly system of claim 14 wherein said top surface of said stop portion defines at least one groove.

16. The truss assembly system of claim 14 wherein said top surface of said stop portion defines a recess and said fastener is received within said recess.

* * * * *